US008275415B2

(12) United States Patent
Huslak (10) Patent No.: US 8,275,415 B2
(45) Date of Patent: Sep. 25, 2012

(54) SYSTEMS AND METHODS FOR MULTI-DEVICE WIRELESS SIM MANAGEMENT

(75) Inventor: Nicholas S. Huslak, Johns Creek, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 766 days.

(21) Appl. No.: 12/370,666

(22) Filed: Feb. 13, 2009

(65) Prior Publication Data

US 2010/0210304 A1     Aug. 19, 2010

(51) Int. Cl.
*H04M 1/38* (2006.01)
(52) U.S. Cl. ........................................ 455/558; 455/419
(58) Field of Classification Search .................. 455/419, 455/420, 552.1, 558
See application file for complete search history.

(56) References Cited

U.S. PATENT DOCUMENTS

| | | | |
|---|---|---|---|
| 8,005,468 B2 * | 8/2011 | Marolia et al. | 455/418 |
| 2005/0282531 A1 * | 12/2005 | Andreasson | 455/418 |
| 2008/0020755 A1 * | 1/2008 | Liu et al. | 455/432.1 |

* cited by examiner

*Primary Examiner* — James H Cho
(74) *Attorney, Agent, or Firm* — Moazzam & Associates, LLC (57) ABSTRACT

Devices, systems and methods are disclosed for automated multi-device, multi-persona wireless SIM management. A virtual SIM database associated with a user is maintained on the mobile service provider's network. Such a virtual SIM database contains multiple personas for that user. For each of the user devices they wish to use on the mobile service network, the user is furnished with one "stub" SIM to be installed on the user device, onto which may be loaded any one of the personas maintained by the virtual SIM database. Upon an event, a selected user device downloads a selected persona from the network and loads it onto its stub SIM, so that the selected device is now registered on the network with that persona.

13 Claims, 10 Drawing Sheets

SYSTEMS AND METHODS FOR MULTI-DEVICE WIRELESS SIM MANAGEMENT

BACKGROUND OF THE INVENTION

1. Field of the Invention

The present invention relates to the field of telecommunications. In particular, the present invention relates to dynamic management of the Subscriber Identification Module (SIM) card on telecommunications devices.

2. Background of the Invention

As mobile device technology matures, more and more users wish to use multiple user devices, and multiple identities, to connect to their mobile service network. For example, one user may prefer to use one user device at work, with one set of features, while using a different user device with a different set of features at home, all the while maintaining a single identity on the network. A user may additionally present multiple identities to the network. For example, a user at work may use their "work" identity for making telephone calls related to business and a "personal" identity for making personal telephone calls. This may be, for instance, to avoid billing their personal calls to their office.

Such identities are called "personas." Typically, on the mobile service network itself, such distinct personas correspond to distinct International Mobile Service Identity (IMSI) numbers for the different personas of the user. In the most general case, a user may wish to manage multiple personas on multiple user devices.

Use of multiple user devices and multiple personas presents challenges for both users and service providers, as usually the subscriber's identity on the network is derived from information stored on a Subscriber Identification Module (SIM) card that must be physically loaded onto the user device. Traditionally, management of which persona is active on which user device had to be handled manually by the user. The user selects the SIM card for the desired persona and loads it onto the desired user device.

Such an approach presents several disadvantages. Considering the most general case of a user with multiple personas and multiple user devices, it can be burdensome for the user. Typically, the user has to remove the battery, remove the unwanted SIM card from the selected user device, and insert the desired SIM card, possibly with the use of a small screwdriver. Switching over in this manner may require access to a user device that the user does not even wish to use, if it contains the desired SIM card. If the user has forgotten to bring the user device with them, then they're out of luck. If the user wants access to information stored on a SIM card, such as saved text messages or contact information, they need the SIM card to be physically present, even if it is not in use at the time. Such a procedure also involves a lot of handling of the delicate SIM cards, which can be harmed by the oils in skin. Finally, such an ad hoc method of switchover makes it difficult for the user to implement more planned switchover schemes. For example, a user may wish to activate their "home" persona every day at 5:00 o'clock pm when they get out of work.

More recently, new technologies, like "Dual SIM" telephones, have been introduced to address some of these issues. Such phones contain two slots onto which can be loaded two SIM cards, which can be active simultaneously. However, such a solution still presents disadvantages. Because such telephones require much more hardware than typical phones, they are expensive. For example, such telephones require a slot for each SIM card, a transceiver for each SIM card, etc. Additionally, a user with more than two personas still needs to physically switch out a SIM card to use the third persona. Finally, such a solution doesn't address the issues involved with a user who wishes to use multiple user devices with their set of personas.

Thus, there is a need for methods, systems, and associated devices for multi-device and multi-persona SIM card management that improve on the deficiencies of the current art.

SUMMARY OF THE INVENTION

The present invention discloses systems, methods, and associated devices which provide for automated multi-device, multi-persona management of smart cards with identity information. Such smart cards include, for example, SIM cards, and the examples within this disclosure have been presented in terms of SIM cards for sake of simplicity but the present invention is not limited to such and may be used for any type of smart card containing identity information. A number of virtual SIMs associated with a user are maintained on the mobile service provider's network in a virtual SIM database. Each virtual SIM is related to a different persona for that user (thus, the terms "persona" and "virtual SIM" are used as synonyms in what follows). For each of the user devices the user wishes to use on the mobile service network, the user is furnished with one "stub" SIM to be installed on the user device, onto which may be loaded any one of the personas maintained by the virtual SIM database. Upon an event, a selected user device receives a selected persona from the network and loads it onto its stub SIM, so that the selected device is now registered on the network with that persona. Such a change in the persona loaded onto a stub SIM can be referred to as a "switchover".

In one exemplary embodiment of the present invention, the mobile service network is furnished with a Multi-SIM/Multi-Device (MS/MD) management server and associated databases responsible for managing which user personas are currently active on which user devices. In this embodiment, the user uploads a plurality of SIM management rules to the MS/MD server, which then implements any switchovers of personas on the stub SIMs as determined by the user's preferences as expressed in the SIM management rules.

In another exemplary embodiment of the present invention, a local device, such as a personal computer, is furnished with a local Multi-SIM/Multi-Device management application which allows the user to create a plurality of SIM management rules. Via communication between the user devices and the mobile service network, switchover of personas on the stub SIMs is effected.

In a further exemplary embodiment of the present invention, the invention is a system of remote management of a persona on a SIM card, including a MS/MD management server, a user device in communication with the SIM card and the MS/MD management server, and a virtual SIM database storing a plurality of personas associated with the user device. Upon an event, the MS/MD management server sends a selected persona from the plurality of personas from the virtual SIM database to the user device, which loads the persona to the stub SIM card.

In yet another exemplary embodiment of the present invention, the invention is a method of remote management of a persona on a SIM card, including designation of a plurality of SIM management rules by a user, upon an event, transmission of a persona to a user device of the user, and registration of the user device on a mobile service network using the persona. The persona to be transmitted to the user device is selected according to the SIM management rules and the event.

In another exemplary embodiment of the present invention, the invention is a wireless telecommunications device including a device processor, a SIM management algorithm running on the device processor, a SIM card processor in communication with the device processor, a SIM card memory in communication with the SIM card processor, and a transceiver in communication with the device processor. Upon an event, a persona is transmitted to the device processor via the transceiver, thereupon to the SIM card processor, thereupon to the SIM card memory, all according to the SIM management algorithm.

DETAILED DESCRIPTION OF THE INVENTION

The present invention discloses systems, methods, and devices which provide for automated multi-device, multi-persona management of smart cards with identity information. Such smart cards include but are not limited to, for example, SIM cards. The examples within this disclosure have been presented in terms of SIM cards for sake of simplicity but the present invention is not limited to such and may be used for any type of smart card containing identity information, as would be appreciated by one having ordinary skill in the art. A virtual SIM database associated with a user is maintained on the mobile service provider's network. Each virtual SIM in the virtual SIM database contains a different persona for that user. This disclosure will use the term "persona" and "Virtual SIM" as synonyms in what follows. For each of the user devices the user wishes to use on the mobile service network, the user is furnished with one "stub" SIM to be installed on the user device, onto which may be loaded any one of the personas maintained by the virtual SIM database. Upon an event, a selected user device downloads a selected persona from the network and loads it onto its stub SIM, so that the selected device is now registered on the network with that persona. Such a change in the persona loaded onto a stub SIM can be referred to as a "switchover".

As used herein and throughout this disclosure, a "mobile service network" refers to any automated telecommunications network which allows users to connect to the network other than through a purely "hard-wired" connection, i.e., other than one in which the user's device has a physical connection to the network. For example, the mobile service network may be a cellular RF network connecting mobile phones using any appropriate communications standard (UMTS, GSM, IS-136, etc) and associated communications technologies.

As used herein and throughout this disclosure, a "SIM card" refers to any integrated circuit card containing user identity information with which the user's device registers on the mobile service network. Associated with such a SIM card is a "persona", which refers to the user identity registered on the network with that SIM card. As should be noted, the examples presented in this disclosure are not limited to SIM cards per se and may be applicable to a type of smart cart containing identity information.

As used herein and throughout this disclosure, a "user device" refers to any device with which the user maintains a connection to the mobile service network. Examples of user devices are smart phones, mobile telephones, mobile telephones, laptops, personal computers, satellite phones, a network-connected television, a network-connected appliance, personal digital assistants, etc.

For purposes of this disclosure, de-activation of a persona on a user device is considered to be loading of a null persona onto the user device. All that is disclosed regarding transmission of a persona to a user device may apply to de-activation of a persona on a user device as well.

For the following description, it can be assumed that most correspondingly labeled structures across the figures (e.g., 132, 232 and 332, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1A:
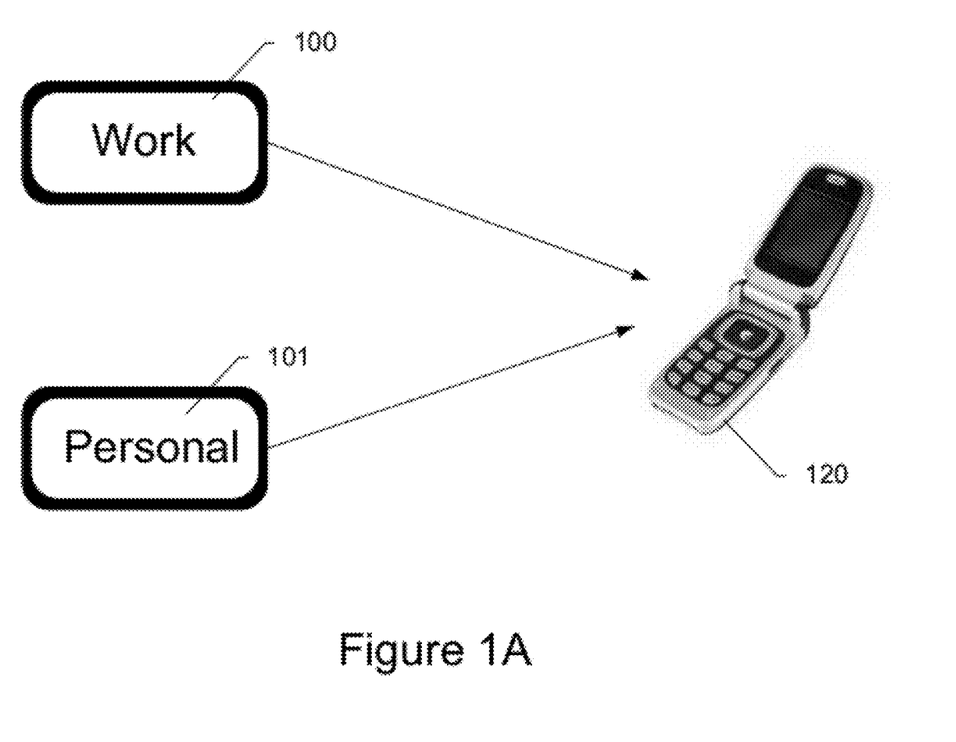
FIGS. 1A and 1B show a user's view of the capabilities of the present invention, according to an exemplary embodiment of the present invention.
Figure 1B:
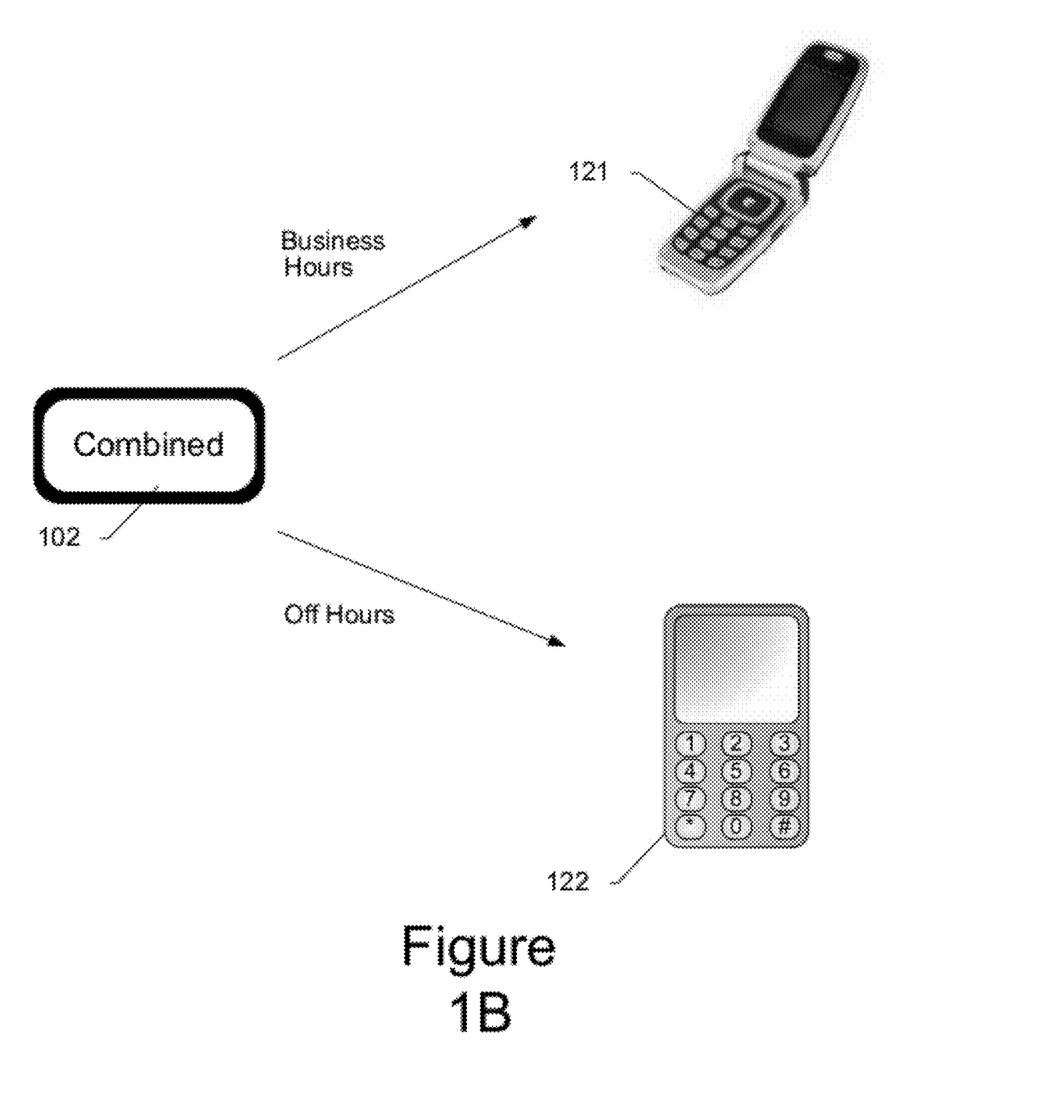

FIGS. 1A and 1B display a user's view of the capabilities of the present invention, according to an exemplary embodiment of the present invention. Associated with a user of a mobile service network is a plurality of personas. Such personas are characterized on the mobile service network by unique identification numbers. In one embodiment of the present invention, these identification numbers are IMSI numbers. Associated with each persona is a distinct set of user telecommunications information, such as user contacts, saved text messages, a billing account, etc. Additionally, associated with the user is a plurality of user devices, each of which contains a stub SIM onto which the user selectively loads one of the associated personas.

Often a user wishes to use multiple personas on the same device at different times. For instance, the user wants to separate the billing for personal calls and work calls, but wants to use the same device for both.

In FIG. 1A, associated with the user are two personas, a "work" persona 100 and a "personal" persona 101 for use on a single user device 120. The user switches between these two personas on device 120 as is desired. For example, the user may have work persona 100 active during normal working hours and personal persona 101 active during non-work hours. This allows the user to separate work calls from personal calls, as well as maintain different contacts for each. The use of multiple personas on a single device may simplify billing, allow for different ringtones or ringback tones for work and personal calls, etc.

Often a user wishes to use a single persona but with multiple devices. For instance, the user may not need all the functions of his work phone when making personal calls. The user may wish his personal phone to be a simple cellular phone with large buttons that is easy to use. The user's work phone may need to be a smart phone with many buttons and applications necessary for work. The user can utilize the same persona for both of these devices and switch between the two. In FIG. 1B, associated with the user is a persona 102, here named "combined", and two user devices 121 and 122. In this embodiment, the user has set up a SIM management rule whereby device 121 is loaded with the "combined" persona during business hours and device 122 is loaded with the "combined" persona during off hours. When the device is not within its hours of use, the stub SIM of each device is blank, the null persona. The systems, methods, and associated devices of the present invention allow the user to wirelessly load any of their associated personas onto any of their associated devices.

Figure 2:
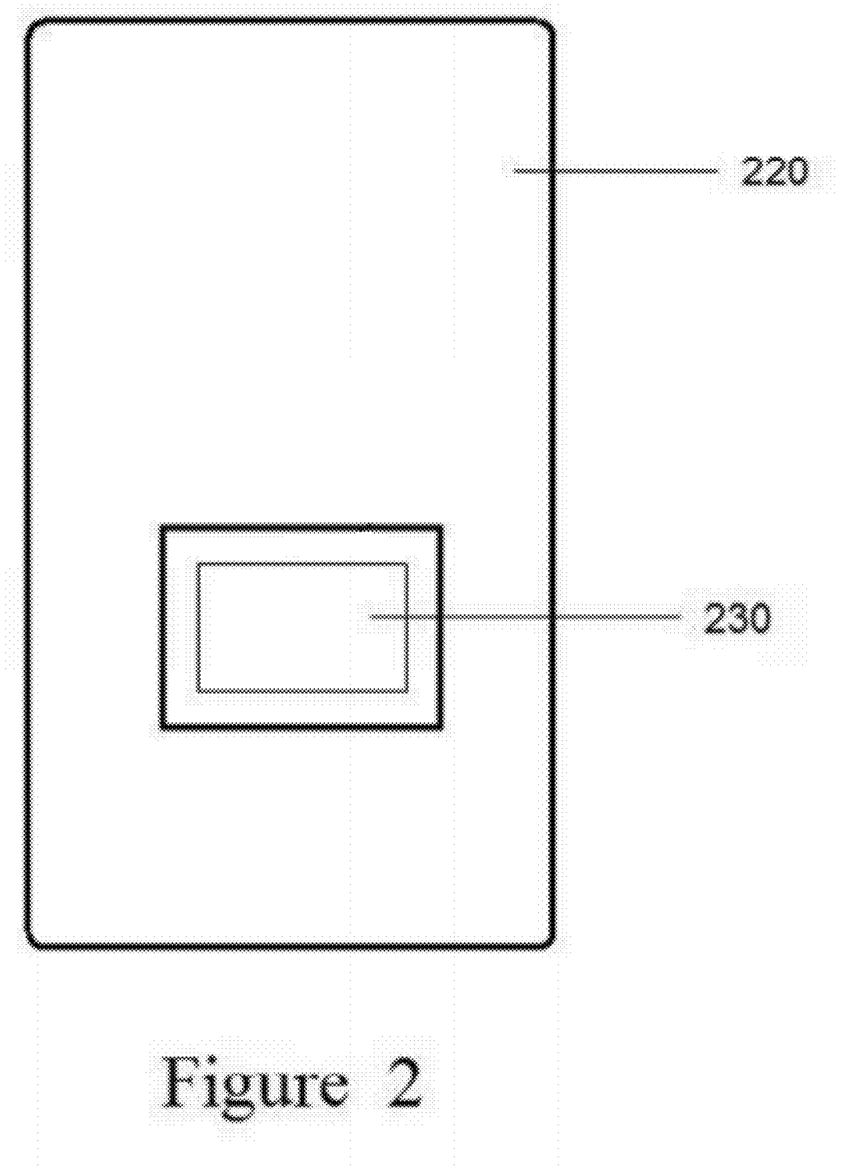
FIG. 2 shows a user device with a stub SIM, according to an exemplary embodiment of the present invention.

FIG. 2 is a view of the back of a user device 220 of the present invention, according to an exemplary embodiment of the present invention. Replacing the SIM card typically inserted into such a device is a "stub" SIM 230 onto which the mobile service network can wirelessly load any persona associated with the user of user device 220. Rather than the user having to swap SIM cards in order to load a given persona on a given device, the persona is downloaded onto stub SIM 230 from the mobile service network so stub SIM 230 can stay in place once it has been installed by the user. Although the method of loading a persona onto stub SIM 230 is unique to the present invention, stub SIM 230 may be otherwise identical to SIM cards that currently are known in the art.

A user may maintain multiple personas on a virtual SIM database stored within the network or on the user's device. The virtual SIM database contains information for each of the personas. The network downloads a persona to the user's device according to predetermined criteria.

Figure 3:
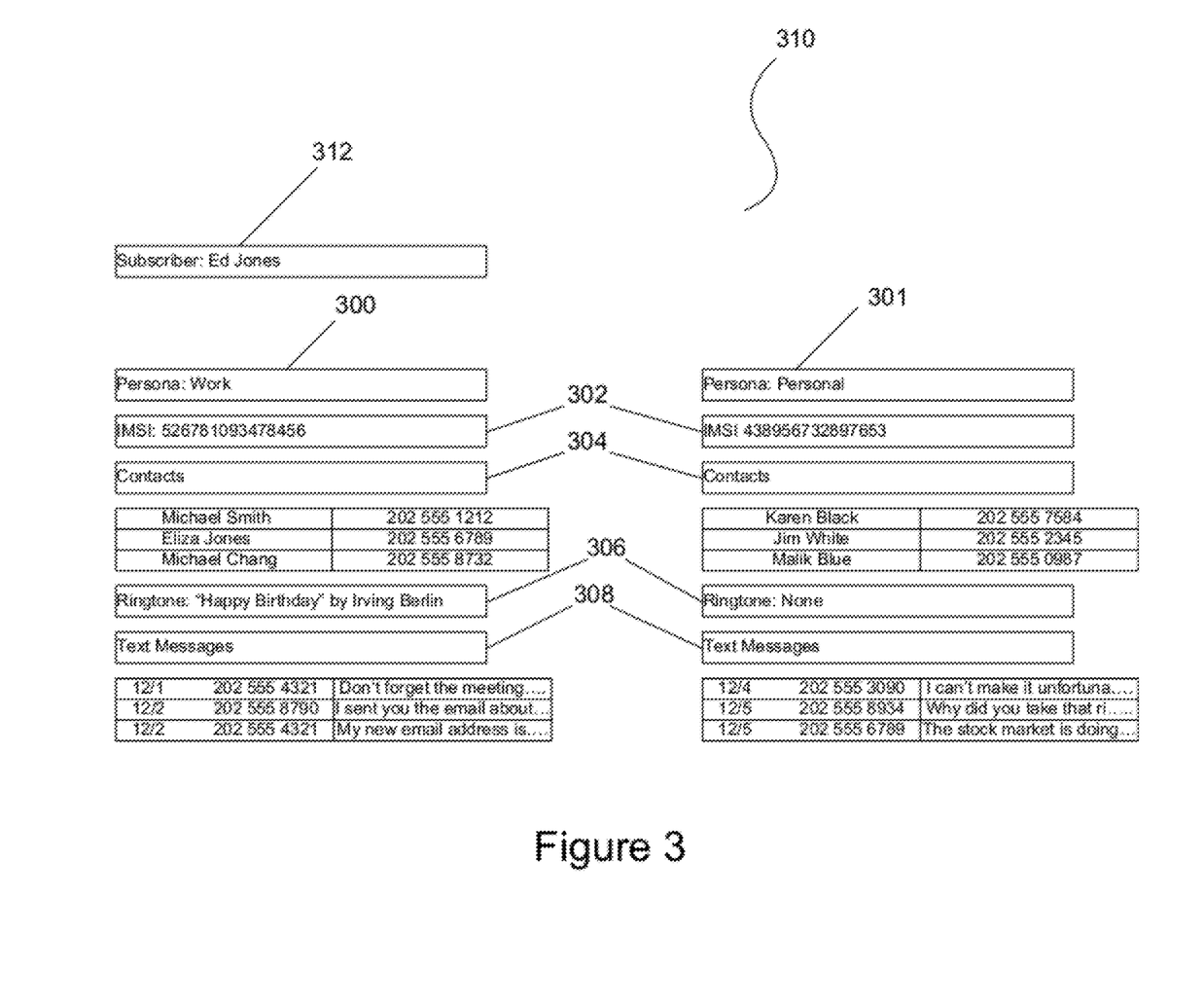
FIG. 3 shows a virtual SIM database maintained on a mobile service network, according to an exemplary embodiment of the present invention.

FIG. 3 displays a virtual SIM database 310, maintained on the mobile service network, associated with a user "Ed Jones", according to an exemplary embodiment of the present invention. The virtual SIM database includes two persona files 300 and 301 linked under a subscriber name field 312. Persona file 300 is labeled "Work" and persona file 301 is labeled "Personal". Each persona file includes a unique persona identification number 302, here labeled "IMSI"; a plurality of user contacts 304; a plurality of user preferences 306, here listed as specific ringtones to be played by the subscribed user's device when that persona is active on a stub SIM; and a plurality of saved text messages 308. Information stored in virtual SIM database 310 that the user can edit on his user device will be referred to as "user entered" information in this disclosure. For personas 300 and 301, user contacts 304 and user preferences 306 thus qualify as "user entered" information. In some embodiments, such a virtual SIM database is "synchronized" with the persona active on the subscribed user's stub SIM in the sense that when the user makes changes to any of the user-entered information, the virtual SIM database is updated with those changes as well.

The provision of a virtual SIM database that links all of the subscribed user's personas together presents advantages for the user. For example, integration of the different personas in a variety of ways becomes possible. In some embodiments of the present invention, when the virtual SIM database is synchronized with the stub SIM due to a change in user entered information, user entered information existing on a currently active persona can optionally be added to other personas on the virtual SIM database as well. For example, if the subscribed user enters a contact to his "Work" persona, such a contact could be optionally added to the "Personal" persona as well. In some embodiments of the present invention, when the virtual SIM database is synchronized with the stub SIM due to a change in user entered information, and such a change is noted to be "in conflict" with user entered information on another persona, an alert is generated that notifies the user of the conflict. In an embodiment where the personas contain appointment calendars, such a conflict happens, for example, when the user enters an appointment on their "Work" calendar that conflicts with an appointment on their "Personal" calendar.

Applications of persona integration become possible that go beyond integration of user-entered information. If the user device supports multiple connections to the mobile service network, it becomes possible for different personas to make use of different channels of communication between the user device and the mobile service network simultaneously due to their linkage in the virtual SIM database. For example, 3G mobile service networks support simultaneous voice and data connections. Only one persona can be loaded onto the stub SIM of the user device at one time. However, in one embodiment of the present invention, the user has permission to "assign" any data transmission over the mobile service network to any persona contained on the virtual SIM database of the persona currently active on the stub SIM. In this embodiment, the persona active on the stub SIM of the user device is referred to as the "active" persona and the persona that the user wishes to assign a data transmission to is referred to as the "assigned" persona. The data transmission the user wishes to assign is referred to as the "assigned" data transmission. For purposes of communication between the mobile service network and the device, the assigned data transmission is routed by the mobile service network using the persona identification number (i.e., IMSI number) of the active persona. However, in those aspects of the mobile service network responsible for accounting for data transmissions, such as a billing server, the data transmission is accounted to the assigned persona. This enables the user to, for example, undertake a voice call while downloading a file, billing the voice call to one persona and the file download to another. Integration of the personas contained in the virtual SIM database enables novel uses of the mobile service network.

Implementation of the system of the current invention may require changes to a mobile service network. These changes allow the network to, for instance, store and maintain virtual SIM databases as well as download personas to user devices.

Figure 4:
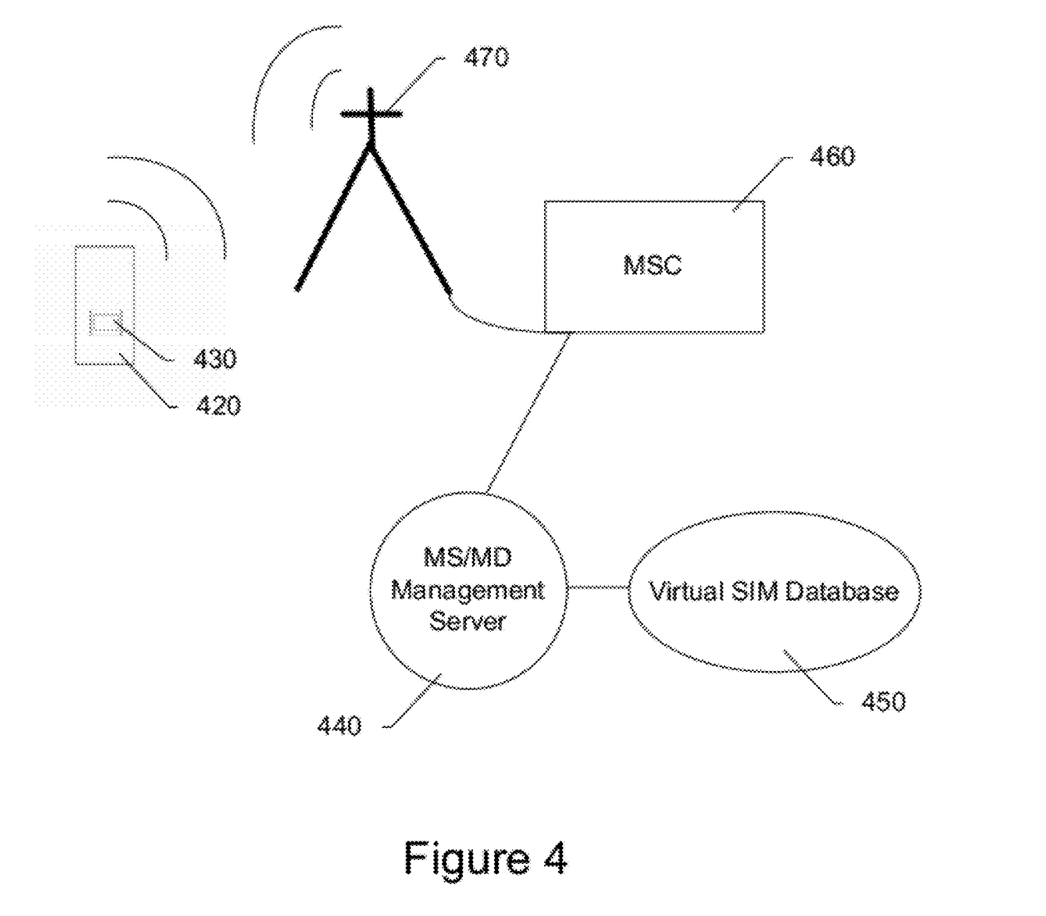
FIG. 4 shows a transfer of persona from a virtual SIM database to a user device, according to an exemplary embodiment of the present invention.

FIG. 4 displays a schematic diagram of novel elements of the mobile service network involved in transmitting a specified persona to a stub SIM 430 of a user device 420 once a request to send that persona to user device 420 has been recognized by the mobile service network, according to an exemplary embodiment of the present invention. In some embodiments, such a request is generated within the network while in other embodiments such a request is received from the user device. A multi-SIM/multi-device (MS/MD) management server 440 sends a request to an associated virtual SIM database 450 for the specified persona, identified by its persona identification number. Virtual SIM database 450 passes the requested persona to MS/MD management server 440, where it is passed to a mobile switching center (MSC) 460 for transmission to user device 420 via a base station 470. The transmission of the specified persona to user device 420 takes place using any appropriate transmission technology and associated protocols. This may include transmission as a SMS text message, as packet-switched data using a GPRS connection, over a 3G data channel, etc. Once the persona has been received by user device 420 it is loaded onto stub SIM 430 of user device 420.

Figure 5:
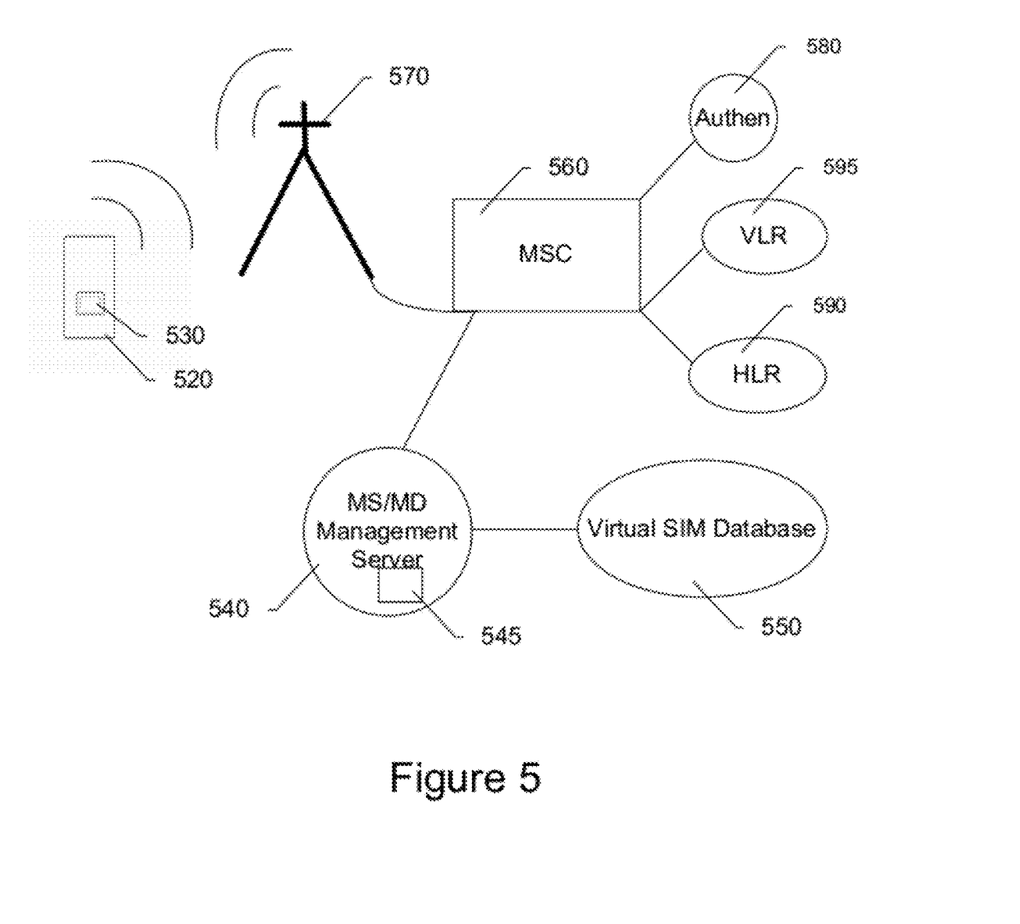
FIG. 5 shows network-based SIM provisioning, according to an exemplary embodiment of the present invention.

FIG. 5 displays a schematic diagram of how information flows over the mobile service network in one system of SIM switchover known as "network based SIM provisioning", according to an exemplary embodiment of the present invention. In this network-based SIM provisioning, a MS/MD management server 540 runs a global SIM management application 545 that tracks all of the user-selected SIM management rules of the user of a user device 520 and thus all of the user/user device/stub SIM attributes associated with those user-selected SIM management rules. Tracking all the user/user device/stub SIM attributes associated with the user-selected SIM management rules of the user of user device 520 requires communication between user device 520 and MS/MD management server 540 via MSC 560 and a base station 570. In this embodiment, a stub SIM 530 of user device 520 is identified on MS/MD management server 540 by its associated Integrated Circuit Card ID (ICCID) number. In some embodiments, the user device attributes associated with the user-selected SIM management rules include a present GPS location of user device 520 and whether or not user device 520 is functioning. When user device 520 is first powered on, it registers on the network via communication with an authentication center 580, which is responsible for authenticating all stub SIMs making a connection to the mobile service network and thereafter generates an encryption key to enable all communications between MSC 560 and stub SIM 530 to be encrypted in the usual manner (e.g., through generation of triplets and use of an appropriate encryption algorithm). For this purpose, associated with stub SIM 530 is a security code, such as a Ki, known also to authentication center 580. Once stub SIM 530 has been authenticated by authentication center 580, stub SIM 530 is registered on MS/MD server 540, a Home Location Register (HLR) 590, and a Visitor Location Register (VLR) 595 using its ICCID and persona identification number, such as an IMSI, if it has one.

Upon an event, MS/MD management server 540 implements the transmission of a specified persona from virtual SIM database 550 to stub SIM 530 of user device 520. The persona to be transmitted has been selected by MS/MD management server 540 based on the SIM management rules chosen by the user. MS/MD management server 540 requests the specified persona from virtual SIM database 550 and passes it to MSC 560 for transmission to user device 520 for its stub SIM 530. MS/MD management server 540 notifies HLR 590 and VLR 595 of the activation of stub SIM 530 with the specified persona. Thereafter, periodically MS/MD management server 540 verifies that stub SIM 530 of user device 520, HLR 590, and VLR 595 all agree on the persona loaded on stub SIM 530 to ensure that, for instance, all phone calls to user device 520 are properly routed and billed. Additionally, if the user has effected any changes in the user-entered information stored on the stub SIM 530 since the last periodic verification, such as if the user added a contact to their list of contacts on their stub SIM, the equivalent persona stored in virtual SIM database 550 is updated. Such periodic verification is referred to as "heartbeat synchronization" between stub SIM 530, HLR 590, VLR 595, and virtual SIM database 550. Because HLR 590 is constantly updated as to which personas are currently active and which are not, the mobile service network knows, for example, which calls to connect in real-time and which calls to connect to a voice mail server.

Because the specified persona must be transmitted to a particular stub SIM 530, and not simply a particular user, in its communications with user device 520, MSC 560 must track all user devices on the network using the ICCIDs of their associated stub SIMs and not only their persona identification numbers (IMSIs). In this embodiment, all user devices register on the network when they are powered on and are tracked in VLR 595 by the ICCID of their associated stub SIMs and their persona identification numbers (IMSIs). User device requests, such as changes to a SIM management rule, are first parsed by HLR 590, which keeps track of all user subscriptions to ensure that the user has subscribed to the requested service. For example, that the user has or has not subscribed to the virtual SIM management service is noted in their profile on HLR 590. In some embodiments where the user has signed up for pre-paid phone service, transmission of a specified persona to a specified device can be blocked if MSC 560 determines, via a call to HLR 590, that the remaining amount of pre-paid minutes in the user's account attached to the specified persona is below a threshold amount. In some embodiments, MSC 560 blocks transmission of the specified persona if it determines that user device 520 is currently in use on the network. For example, user device 520 may be in the midst of a voice call or data transmission.

In further embodiments, such an event triggering switchover is user schedule based upon the current time/day of the week, the present GPS location of the user, the user demand, etc.

Figure 6:
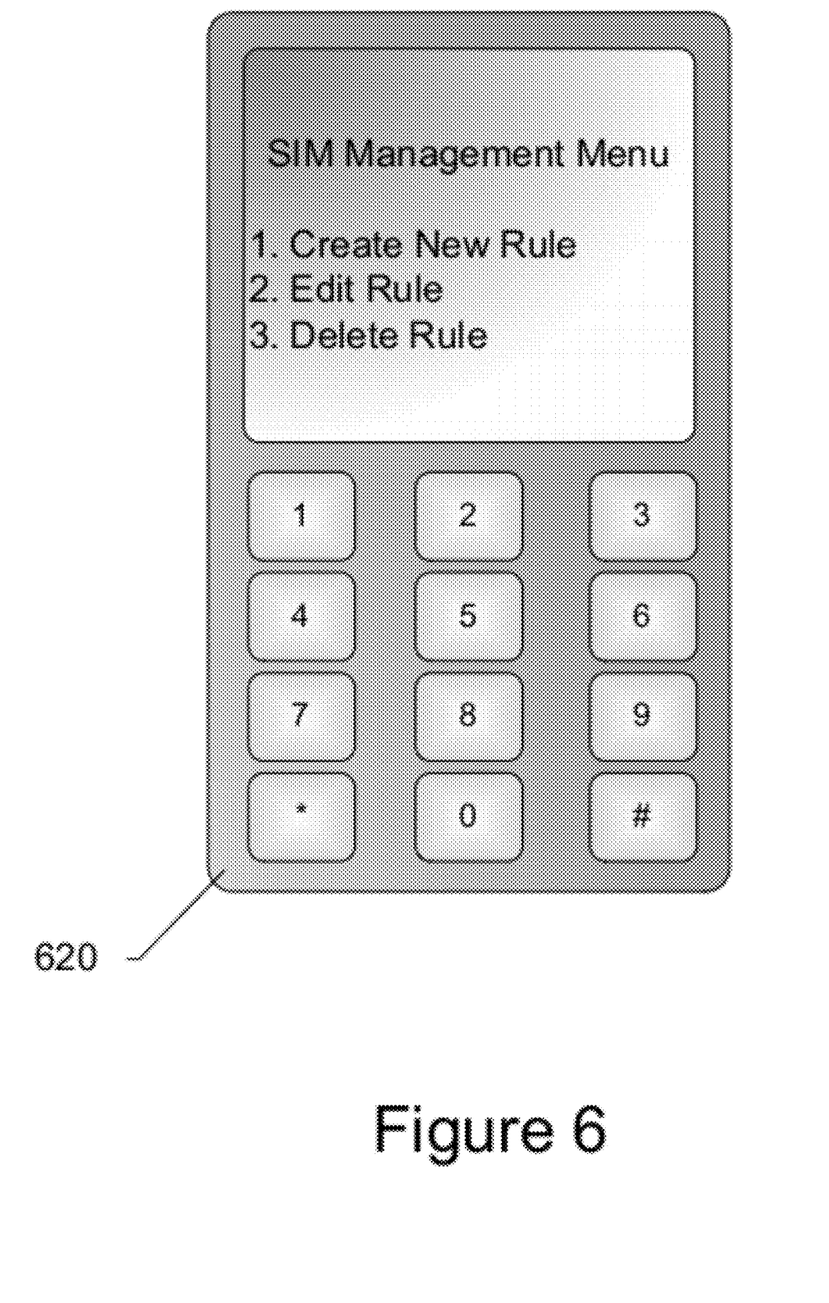
FIG. 6 shows user preferences for SIM management rules for network-based SIM provisioning, according to an exemplary embodiment of the present invention.

FIG. 6 displays a screenshot of a user device 620 in a mode allowing the user to add, edit, or delete a SIM management rule on the global SIM management application on the MS/MD management server, according to an exemplary embodiment of the present invention. In this embodiment, the user enters this mode by generating a request to the MS/MD management server, which downloads a plurality of selectable SIM management rules to user device 620. Selectable SIM management rules include "time/day of week", "schedule", "GPS location", etc. The user uploads the desired SIM management rule to the MS/MD management server via any suitable telecommunications technology and associated protocols, such as GPRS, UMTS, etc. The MSC sends a request to the HLR to verify that the user has subscribed to the virtual SIM database service, and if so, the new SIM management rule is loaded into the global SIM management application on the MS/MD management server.

Figure 7:
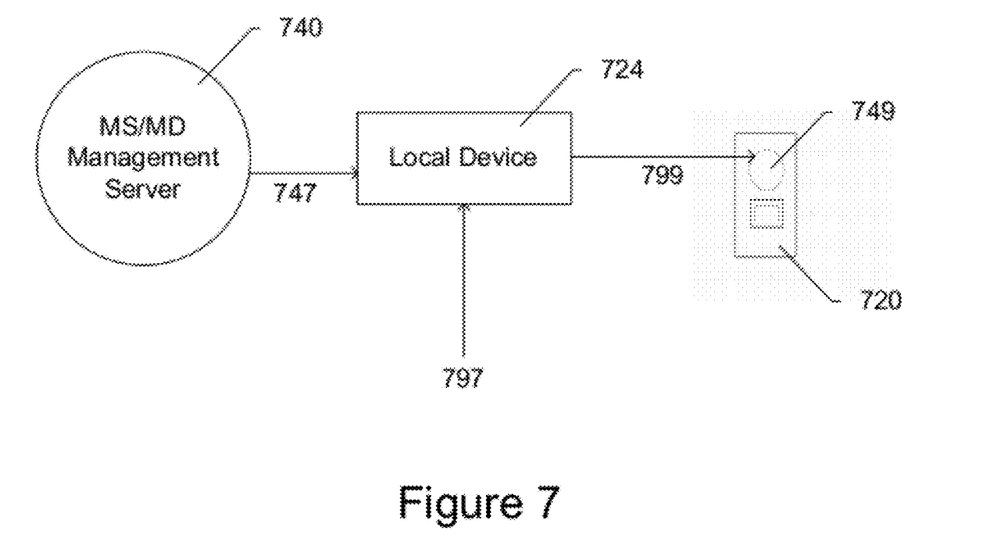
FIG. 7 shows local SIM provisioning, according to an exemplary embodiment of the present invention.

FIG. 7 displays an alternative system of SIM switchover, "local provisioning", according to an exemplary embodiment of the present invention. In this embodiment, a user device 720 generates requests for SIM switchover to the mobile service network. A local MS/MD management application 747 is downloaded from a MS/MD management server 740 to a local device 724. Such a local device may be a personal computer, laptop, etc. A plurality of user inputs 797 to local device 724 are used to set up a plurality of SIM management rules, which are then transmitted to a SIM management application 749 of user device 720. The transmission may use any suitable means of communication between local device 724 and user device 720. In one embodiment, a "synchronization" link 799 using MICROSOFT Mobile Device Center software is used. Because the SIM management rules potentially contain personal information about the user of user device 720, it is important that such synchronization link 799 is secure. Additionally, to ensure that the user does not incorporate an unauthorized SIM card into the SIM management rules, such as a SIM card not authorized for use on the mobile service network, in some embodiments, the acceptable stub SIM ICCIDs are not entered by the user but rather included in local MS/MD management application 747 downloaded from MS/MD management server 740.

Figure 8:
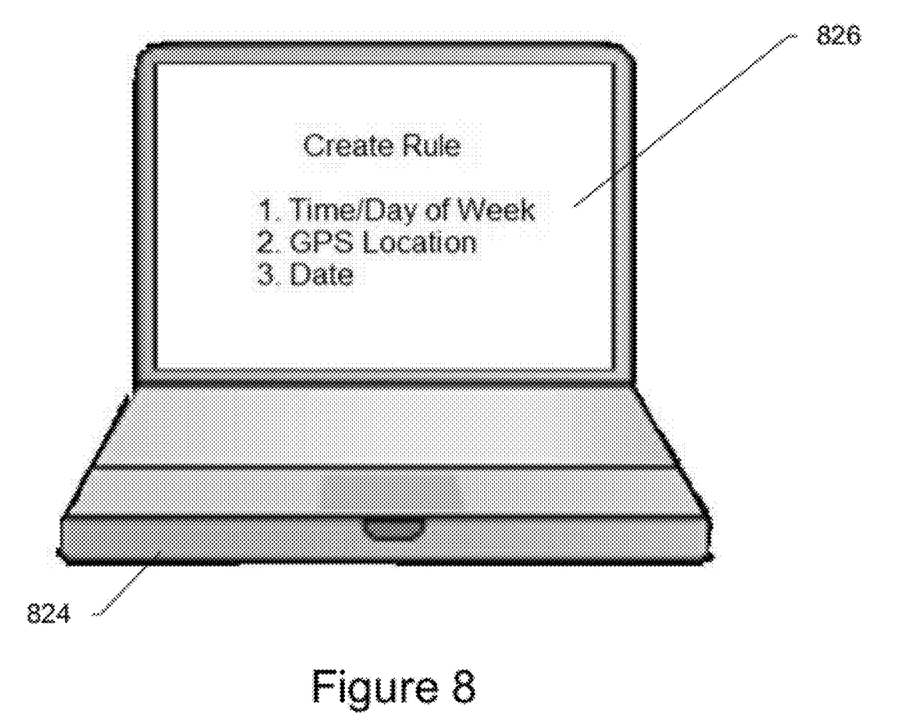
FIG. 8 shows user preferences for SIM management rules for local SIM provisioning, according to an exemplary embodiment of the present invention.

FIG. 8 displays a screenshot of a local device 824 showing a plurality of SIM management rules 826 the user can select and tailor for downloading personas to their stub SIMs, according to an exemplary embodiment of the present invention. Selectable SIM management rules in this embodiment include "time/day of week", "date", "GPS location", etc. Selecting "time/day of week", the user sets up their user devices for automatic switchover of a selected persona to a selected stub SIM of a user device at a certain time of day on a certain day of the week. Selecting "date", the user sets up automatic switchover of a selected persona to a selected stub SIM of a user device at a certain time on a certain date. Selecting "GPS location", the user sets up automatic switchover of a selected persona to a selected stub SIM of a user device whenever the user device is within a certain radius of a specified GPS location, such as the user's home. In some embodiments, an additional SIM management rule able to be selected by the user transmits to the stub SIM of any user device that has just been powered on a pre-determined persona and deactivates the personas resident on any other stub SIMs of the user. Such a SIM management rule is especially useful when there are multiple user devices associated with the user, but only one persona. In some embodiments, if the user is associated with multiple user devices in their virtual SIM database, an additional SIM management rule, able to be selected by the user, transmits the persona on the stub SIM of the currently active device to another inactive, but registered on the mobile service network, user device. This may occur in the event that the mobile service network detects communication failure between itself and the currently active user device. Communication failure could stem from a variety of factors including a user device malfunction, a user device running out of energy, etc. Such a SIM management rule is referred to as "failover".

Figure 9:
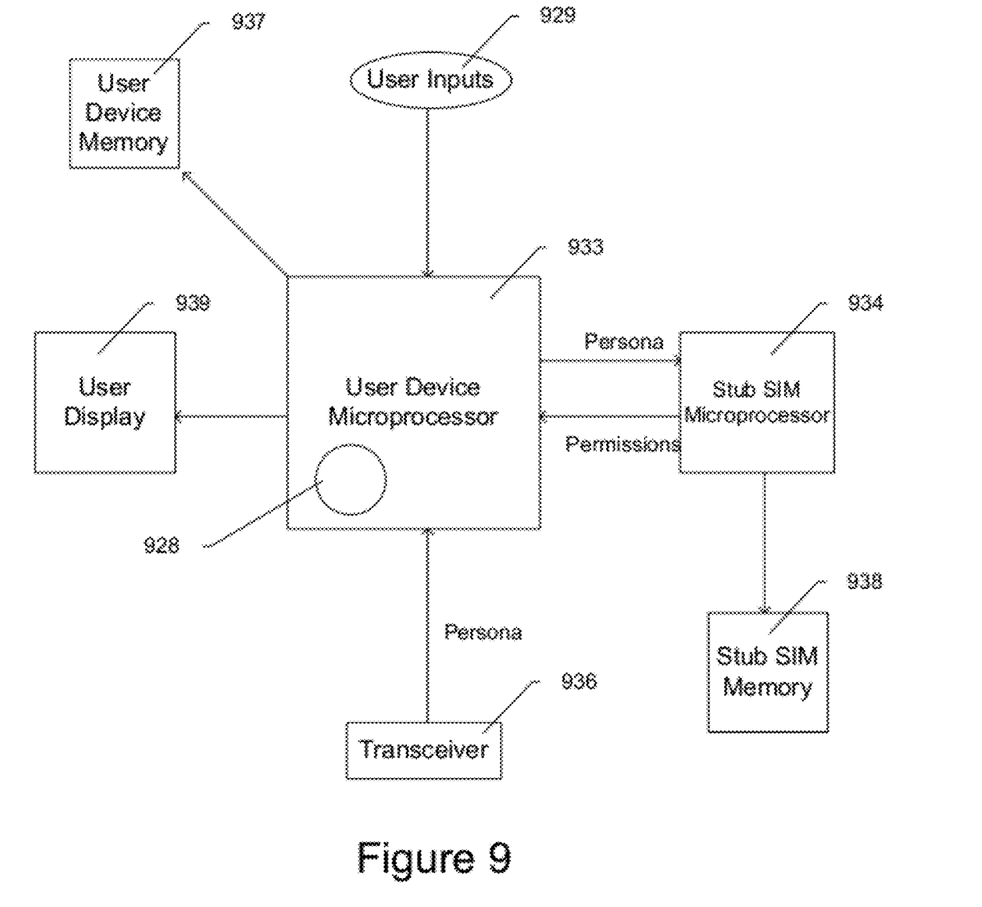
FIG. 9 shows a flow of information over a user device during SIM switchover, according to an exemplary embodiment of the present invention.

FIG. 9 displays the flow of information over the user device during switchover, according to an exemplary embodiment of the present invention. This flow of information is directed by a SIM management algorithm 928 resident on a user device microprocessor 933. The new persona is received at a transceiver 936 and is transferred via user device microprocessor 933 to a user device memory 937 while user device microprocessor 933 enables a connection to a stub SIM microprocessor 934. Communications between user device microprocessor 933 and stub SIM microprocessor 934 occur using any appropriate communication protocols for the stub SIM-user device interface. For example, the ISO-7816-4 communication protocols may be implemented using any appropriate SIM toolkit (STK) standard (GSM 11.11, GSM 11.14, etc.). Once stub SIM microprocessor 934 has notified user device microprocessor 933 that it is ready to accept the new persona, the persona is transferred from user device memory 937 to a stub SIM memory 938. In some embodiments, stub SIM memory 938 is EEPROM memory. Once the new persona has been successfully stored in stub SIM memory 938, SIM management algorithm 928 reboots user device microprocessor 933 and thereupon, the user device is registered on the mobile service network with the new persona. In further embodiments, a message indicating that the new persona has been received is displayed to the user via a user display 939 and the user must approve of the switchover before the new persona is loaded onto the stub SIM by assenting via a plurality of user inputs 929.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system of remote management of a persona on a Subscriber Identification Module (SIM) card, comprising:
   a Multi-SIM/Multi-Device (MS/MD) management server in communication with a user device in communication with the SIM card; and
   a virtual SIM database storing a plurality of personas associated with the user device,
   wherein, upon an event, the MS/MD management server receives a plurality of SIM management rules from a user device, sends a selected persona from the plurality of personas from the virtual SIM database, and transmits the selected persona to the user device, which loads the selected persona to the SIM card;
   wherein the selected persona transmitted to the user device is selected according to the plurality of SIM management rules and the event.

2. The system of claim 1, wherein the event is one or more of a GPS location of the user device, a communication failure of a second user device, an occurrence of a pre-set time and a pre-set day of the week, and an occurrence of a pre-set time and a pre-set date.

3. The system of claim 1, wherein the MS/MD management server runs a global SIM management application which detects the event.

4. The system of claim 1, wherein a SIM management application running on the user device detects the event and sends a notice to the MS/MD management server requesting transmission of the selected persona.

5. The system of claim 1, wherein the second user device is able to be loaded with the selected persona in place of loading the persona on the user device.

6. The system of claim 1, wherein the user device is one of a mobile phone, a smart phone, a satellite phone, a laptop, a network-connected television, a network-connected appliance, a personal digital assistant, and a personal computer.

7. The system of claim 1, wherein at a later time, the transmitted persona is synchronized with one of the plurality of personas associated with the user device on the virtual SIM database.

8. A method of remote management of a persona on a SIM card, comprising:
   receiving a plurality of SIM management rules from a user device;
   transmitting, upon an event, a persona to a user device; and
   registering the user device on a mobile service network using the persona, wherein the persona transmitted to the user device is selected according to the plurality of SIM management rules and the event.

9. The method of claim 8, wherein the event is one or more of a GPS location of the user device, a communication failure of a second user device, an occurrence of a pre-set time and a pre-set day of the week, and an occurrence of a pre-set time and a pre-set date.

10. The method of claim 8, wherein the SIM management rules run on a MS/MD management server in communication with the user device.

11. The method of claim 8, wherein the SIM management rules run on the user device.

12. The method of claim 8, wherein the user device is one of a mobile phone, a smart phone, a satellite phone, a laptop, a network-connected television, a network-connected appliance, a personal digital assistant, and a personal computer.

13. The method of claim 8, wherein the persona is synchronized with one of a plurality of personas stored on a virtual SIM database in communication with the MS/MD management server.

* * * * *